Jan. 6, 1953 C. W. BRYANT 2,624,644
VALVE ACTUATING MECHANISM
Filed July 31, 1947
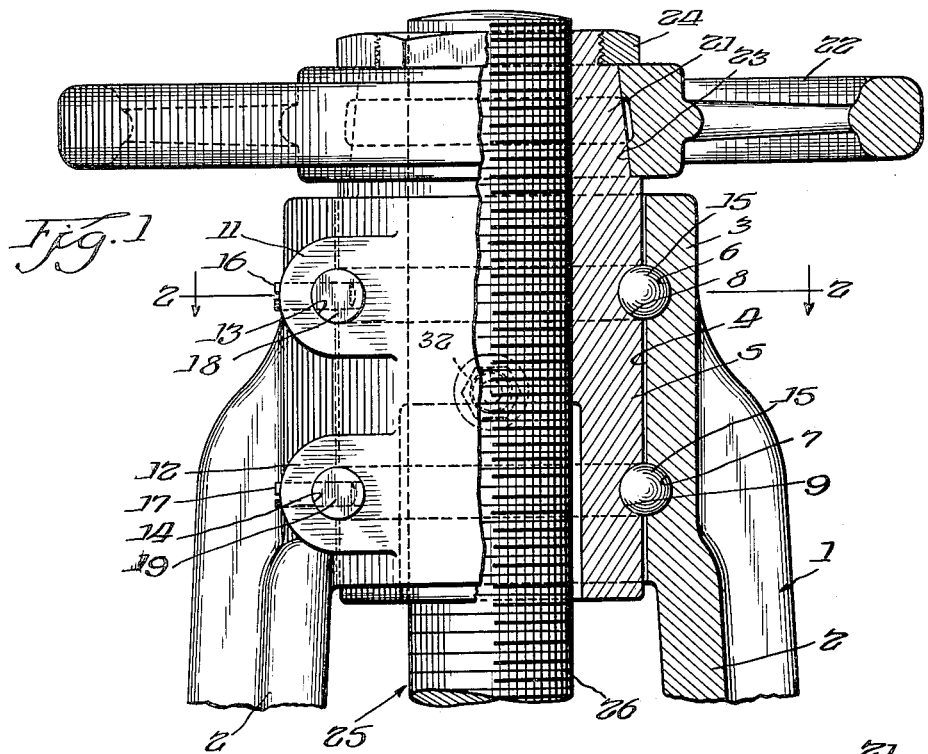
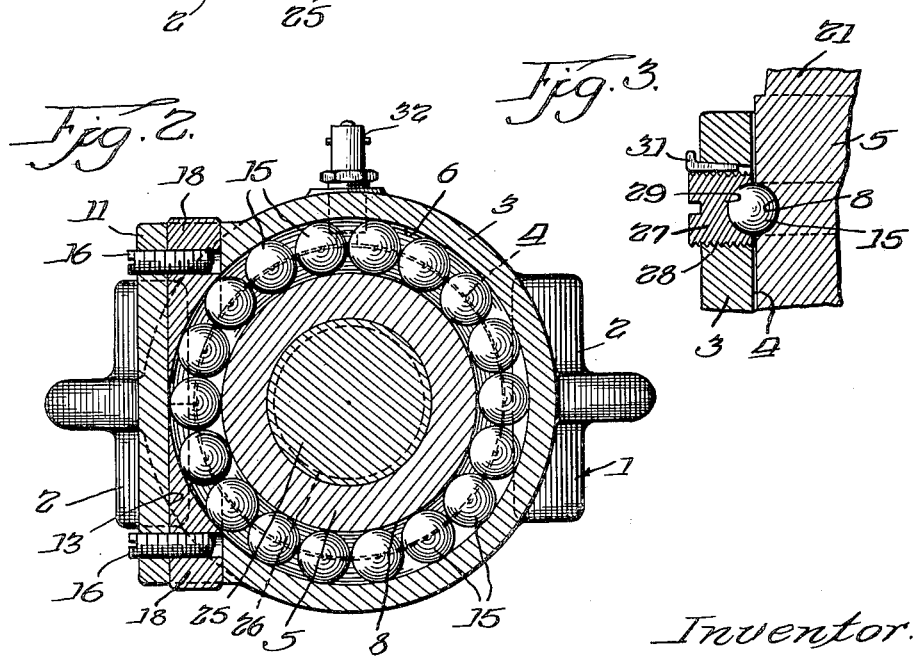
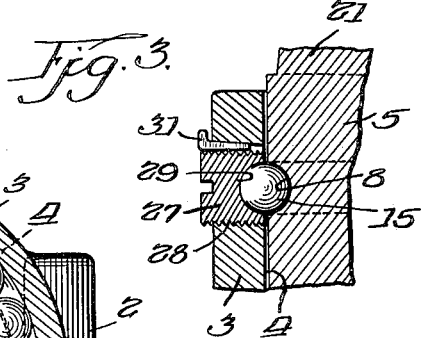
Inventor:
Corwin W. Bryant.
By Joseph O. Lange
Atty.

Patented Jan. 6, 1953

2,624,644

UNITED STATES PATENT OFFICE 2,624,644

VALVE ACTUATING MECHANISM

Corwin W. Bryant, Downers Grove, Ill., assignor to Crane Co., Chicago, Ill., a corporation of Illinois Application July 31, 1947, Serial No. 765,118

1 Claim. (Cl. 308—198)

This invention relates to a valve actuating mechanism and more particularly it is concerned with a relatively simple arrangement of ball bearings for valve yoke sleeves to inhibit longitudinal movement of the later member while facilitating rotative movement thereof during the course of valve actuation.

Preferably it is one of the principal objects of this invention to provide a construction in which half of the ball race recess is provided in the yoke sleeve proper and the other half race or recess is provided in the yoke.

A further important object of this invention is to provide an anti-frictional mounting arrangement between a valve yoke sleeve and its supporting member. More specifically the latter arrangement is accomplished in the most simplified manner by having the outer ball race in the supporting member and the inner ball race in the yoke sleeve.

One of the more important objects is to provide actuating means whereby the relatively more expensive stock or production type ball bearings, having an annular contact completely enclosed in races, are avoided. It should be understood in the latter connection that use of the construction referred to requires close machining of the parts to be assembled in the usual assembly, which in the instant invention is not required for relatively low speed application of valve operation.

Thus it is another object of this invention to provide a structure in which conventional bearings are unnecessary, thereby circumventing the need for relatively larger assemblies for installation and the close expensive machining operations, while at the same time reducing the number of parts in the final assembly.

Another object is to provide a construction in which not only the number of parts employed are substantially less, but also one in which a substantially greater thrust load may be sustained within a limited space in view of employing a full ball bearing in contrast to one of the spacer ball type.

Another object is to provide a construction in which the introduction of the balls is easily and cheaply accomplished and the renewal thereof may be similarly affected.

Other objects and advantages will become more readily apparent in connection with reading the specification in light of the accompanying drawings in which Fig. 1 is a fragmentary sectional view of a preferred body of the invention.

Fig. 2 is a sectional view on line 2—2 of the structure shown in Fig. 1.

Fig. 3 is a fragmentary section of modified form of retaining means.

Similar reference characters refer to similar parts throughout the several views.

Referring now to Fig. 1, a conventional valve yoke 1 such as that illustrated on page 149 of Crane Co's. Catalog No. 41, is shown provided with the usual oppositely disposed ribbed arms 2 and having the upper hub portion 3 bored out as at 4 to reecive the yoke sleeve 5, the yoke sleeve fitting relatively snugly for rotation within the said bore of the yoke for reasons hereinafter explained. Suitably spaced apart are the annularly extending spaced apart ball races 6 and 7 machined within the bore 4 of the yoke hub 3. The outer periphery of the yoke sleeve 5 at locations in the same plane as the grooves 6 and 7 is provided with the complementary spaced apart upper and lower grooves 8 and 9, respectively, matching with the grooves 6 and 7. As shown more clearly in Fig. 2, the yoke at 11 and 12 is provided with the bosses preferably made integral with the yoke hub 4, and as indicated at 13 in Fig. 2 and at 14 in Fig. 1, the hubs 11 and 12 respectively, are bored out so that ports are formed to receive the cylindrical retainer plugs 18, 18 and 19, 19. Each of these plugs is arcuately recessed as indicated, to form a continuation of the outer recess or groove 6 for the balls 15. While four plugs 18, 18 and 19, 19 are shown only single plugs 18 and 19 may be used for the insertion of the balls. Thus the bearings 15 are insertable by removal of one or both of the respective cylindrical plugs and after a sufficient number have been inserted to fill almost solidly the annular spaces as indicated, the plugs are replaced and positively held in place by the set screws transversely positioned as at 16 and 17. Thus it should be apparent that the yoke sleeve 5 is mounted in fixed longitudinal position but is freely rotated on the ball bearings 15.

It should of course, be apparent that a single row of balls may be used instead of the two rows shown, or a plurality of rows might be required for additionally heavy loads and for longer wear. It should also be understood that the ball races 6 and 8 and 7 and 9 and also the retainer plugs 18 and 19 may be specially hardened where service indicates the desirability of such special construction. It should be clear that the upper portion of the yoke sleeve may follow the conventional design in that the yoke sleeve is provided with the polygonal portion 21 shown, upon which the handwheel 22 having the similarly formed recess 23 is positioned and is held in place by means of the wheel nut 24. The conventional valve stem 25 having the threads as at 26 is threadedly mounted within the yoke sleeve 5 and therefore by rotation of the handwheel allows for the reciprocal longitudinal movement of the said stem. At its lowermost end portion the latter member has a closure member projecting within the valve body, the body and closure members not being shown, but being of either gate or globe disc form.

Referring now to the modified form shown in Fig. 3, the balls 15 may also be retained within the respective races 6, 7, 8 and 9 by means of the retainer plug 27 threadedly attached as at 28 and having a transversely extending recessed end portion 29 within which the balls may arcuately pass during the course of rotation within the grooves 8 and 9, the hollow portion 29 coinciding with and completing the grooved portions 6 and 7. Thus the balls 15 instead of being introduced to the respective races in substantially tangential relationship to the latter, in this modified form they are introduced substantially at right angles to the respective races. The transverse groove 29 is preferably extended parallel to the outer screw driver slot shown and when the groove direction has been properly established upon rotation of the plug 27, the tapered key 31 is driven into position as shown to lock the plug against rotation.

For purpose of providing desirable lubrication, the lubricator connection 32 may be used if desired.

It should of course be apparent that while only two forms are shown of the application of this invention, this is done merely for purpose of illustration, and the invention, therefore, may be modified further and embodied in other forms without departing from the spirit or scope of the appended claim.

I claim:

In valve actuating means, the combination comprising a stationary member including a yoke hub, a rotatable member mounted in fixed axial relation within said yoke hub, means for retaining said rotatable member against longitudinal movement, the said latter means comprising inner and outer complementary annular recesses respectively in said rotatable member and in said yoke hub, anti-friction means inserted substantially tangentially within said recesses for rotational movement within said recesses when the said rotatable member is moved, non-rotatable plug means predeterminately fixed for retaining said anti-friction means, the said plug means having a plain cylindrical surface and an inner arcuately curved end wall portion coinciding with and forming a continuation of the outer one of the annular recesses of the yoke hub and being detachably secured to the said yoke hub.

CORWIN W. BRYANT.

REFERENCES CITED

The following references are of record in the file of this patent:

UNITED STATES PATENTS

| Number | Name | Date |
|---|---|---|
| 695,838 | Ritchie | Mar. 18, 1902 |
| 1,394,110 | Nelson | Oct. 18, 1921 |
| 1,753,276 | Quinn et al. | Apr. 8, 1930 |
| 1,777,115 | Bruback et al. | Sept. 30, 1930 |
| 1,905,039 | McKellar | Apr. 25, 1933 |
| 1,905,079 | Wellensiek | Apr. 25, 1933 |
| 2,194,262 | Allen | Mar. 19, 1940 |
| 2,315,574 | Anderson | Apr. 6, 1943 |

FOREIGN PATENTS

| Number | Country | Date |
|---|---|---|
| 8,314 | Great Britain | 1902 |
| 197,861 | Great Britain | May 24, 1923 |